(12) United States Patent
Forsyth

(10) Patent No.: US 9,668,403 B2
(45) Date of Patent: Jun. 6, 2017

(54) APPARATUS TO IMPROVE FIELD APPLICATION OF ANHYDROUS AMMONIA IN COLD TEMPERATURES

(71) Applicant: Daniel L. Forsyth, Oelwein, IA (US)

(72) Inventor: Daniel L. Forsyth, Oelwein, IA (US)

( * ) Notice: Subject to any disclaimer, the term of this patent is extended or adjusted under 35 U.S.C. 154(b) by 185 days.

(21) Appl. No.: 14/552,703

(22) Filed: Nov. 25, 2014

(65) Prior Publication Data
US 2015/0144040 A1  May 28, 2015

Related U.S. Application Data

(60) Provisional application No. 61/908,359, filed on Nov. 25, 2013.

(51) Int. Cl.
*A01C 23/02* (2006.01)

(52) U.S. Cl.
CPC .................................. *A01C 23/024* (2013.01)

(58) Field of Classification Search
CPC combination set(s) only.
See application file for complete search history.

(56) References Cited

U.S. PATENT DOCUMENTS

| | | | |
|---|---|---|---|
| 3,372,658 A * | 3/1968 | Ammann | A01C 23/024 111/119 |
| 3,556,027 A * | 1/1971 | Ammann | A01C 23/024 111/119 |
| 3,908,567 A * | 9/1975 | Brannan | A01C 23/023 111/119 |
| 4,069,029 A | 1/1978 | Hudson | |
| 4,385,500 A | 5/1983 | Kjelgaard et al. | |
| 4,903,618 A | 2/1990 | Blair | |
| 5,178,078 A | 1/1993 | Pendergrass | |
| 5,890,445 A | 4/1999 | Ridgley | |
| 5,967,066 A | 10/1999 | Giles et al. | |
| 6,269,757 B1 | 8/2001 | Kiest | |
| 7,779,768 B2 * | 8/2010 | Forsyth | A01C 23/024 111/119 |

* cited by examiner

*Primary Examiner* — Alicia Torres
(74) *Attorney, Agent, or Firm* — Shuttleworth & Ingersoll, PLC; Brett Papendick

(57) ABSTRACT

An apparatus and method to improve delivery of liquid anhydrous ammonia from a portable liquid $NH_3$ tank in cold temperatures includes an air compressor coupled to the vapor port of a portable liquid $NH_3$ tank used to supply liquid anhydrous ammonia to an anhydrous ammonia fertilizer applicator. The apparatus can include an actuator to relieve the tank of compressed air after the tank is empty of liquid anhydrous ammonia.

12 Claims, 2 Drawing Sheets

APPARATUS TO IMPROVE FIELD APPLICATION OF ANHYDROUS AMMONIA IN COLD TEMPERATURES

CROSS-REFERENCE TO RELATED APPLICATIONS

The present application claims priority to provisional patent application 61/908,359 which was filed on Nov. 25, 2013, and is hereby expressly incorporated by reference in its entirety.

BACKGROUND OF THE INVENTION

The present invention pertains to applicators for injection of anhydrous ammonia ($NH_3$) into soil as a fertilizer.

In the application of anhydrous ammonia as a fertilizing agent, it is usual to utilize an applicator which includes a number of injection knives which are drawn on a tool bar with each knife making a small furrow in the soil. A conduit to carry anhydrous ammonia ($NH_3$) is carried on each knife shank and terminates at the lower end of the knife, thereby permitting a stream of $NH_3$ to be inserted in the furrow. The furrow is then closed, trapping the $NH_3$ in the soil.

For purposes of supplying an anhydrous ammonia applicator, a portable tank containing liquid $NH_3$ under pressure is drawn behind the applicator and $NH_3$ from the tank is permitted to escape through a liquid conduit which couples to a control/distribution unit which distributes $NH_3$ to the knives on the applicator. The $NH_3$ is forced from the tank by vapor pressure within the tank in the vapor head above the liquid level of the tank. As the tank empties or as atmospheric temperatures decline, the head pressure declines, and less pressure is available in the tank to urge liquid $NH_3$ into the liquid conduit.

In addition to having a port for intake or discharge of liquid pressurized $NH_3$, portable tanks for transport of liquid $NH_3$ include a vapor port which communicates with the interior of the tank and is controlled by a shut off valve to prevent escape of $NH_3$ gas from the tank. When liquid $NH_3$ is being pumped into a portable tank, a vapor hose is connected to the vapor port on the tank and its shut off valve opened in order to allow movement of gaseous $NH_3$ from the tank while liquid $NH_3$ is being pumped into the tank. The vapor being allowed to exhaust from the tank is ported back to the main $NH_3$ supply container.

When $NH_3$ is being applied to a field, the head pressure of the $NH_3$ vapor in the tank forces liquid $NH_3$ from the tank. As the atmospheric temperature drops, the pressure of the gaseous $NH_3$ in the pressure head of a portable $NH_3$ tank drops, providing less pressure on the liquid $NH_3$ in the tank resulting in the slowing movement of the liquid $NH_3$ from the tank and into the ducts carried on the applicator knives. For example, at an outdoor temperature of 30° F., the pressure may only be forty pounds per square inch. This is a pronounced problem for application of $NH_3$ fertilizer because application is preferably accomplished in the fall season, after harvest of grain crops from the field. Therefore, $NH_3$ application on a cold day is slowed and may become erratic because insufficient pressure remains in the pressure head of the portable tank to supply a steady stream of liquid $NH_3$. Additionally, as the $NH_3$ portable tank is emptied, the pressure of the head declines and liquid $NH_3$ is discharged more slowly even if atmospheric temperatures are summer like. To adjust for the problem of low head pressure, the operator of the fertilizer applicator must slow greatly to be sure adequate $NH_3$ is being applied to the soil. This need substantially reduces productivity of the application equipment and the operator.

Previous efforts to overcome the problem of reduced flow of liquid $NH_3$ when the atmospheric temperature is low include increasing the size of the liquid conduit from the tank, drawing from two or more tanks at the same time, and drawing liquid $NH_3$ from a port in the bottom of the tank instead of from the standard dip tube provided on the top of the tank. These methods provide additional shortcomings or are ineffective. Drawing a second or third tank over the soil causes increased fuel consumption of the tractor or other power unit, as well as increasing compaction of the soil from additional wheels passing over the soil. Adding a bottom port to a standard dip tube equipped tank adds expense and increases the possibility for leakage from the tank, while doing little to solve the problem.

Apparatus to maintain a preset pressure in the pressure head of the portable $NH_3$ tank would be very desirable for use by operators of $NH_3$ application equipment.

BRIEF SUMMARY OF THE INVENTION

The present invention provides a solution to the problem of reduced head pressure in a portable anhydrous ammonia transport tank supplying an anhydrous ammonia fertilizer applicator. An air compressor is coupled to the vapor port of the portable $NH_3$ tank to cause increase of the pressure in the pressure head in the portable $NH_3$ tank as needed, particularly when the atmospheric temperature is low or the liquid $NH_3$ level is low, which results in a reduced pressure of the $NH_3$ vapor present above the liquid $NH_3$ in the tank. A regulator controls the flow of air under pressure being injected through the vapor port into the tank such that the pressure in the pressure head can be maintained at least approximately 80 psi under all conditions. As the atmospheric temperatures vary on an autumn day, the pressure regulator will control the pressure of the vapor head in the tank, causing the compressor to operate as needed to maintain a desired pressure.

The invention further includes apparatus to allow excess compressed air in the nurse tank to be exhausted from the tank into the fluid lines and/or the vapor lines to the knives, thereby passing any anhydrous ammonia vapor accompanying the compressed air safely into the soil. The apparatus for exhausting build up compressed air from the nurse tank includes valves and ducts which interconnect with the fluid line and an actuator to open a main valve coupled to the vapor port of the nurse tank to the fluid lines passing to the knives.

It is accordingly a primary object of the invention to provide a apparatus to maintain head pressure within a portable anhydrous ammonia tank used to supply a fertilizer application device so that sufficient flow of $NH_3$ continues regardless of the atmospheric temperature at the time the application device is used, and to allow safe release of compressed air from the nurse tank when the tank is empty and ready for refilling with anhydrous ammonia.

These and other objects of the invention will become apparent from examination of the detailed description of the invention which follows.

DETAILED DESCRIPTION OF THE INVENTION

Figure 1:
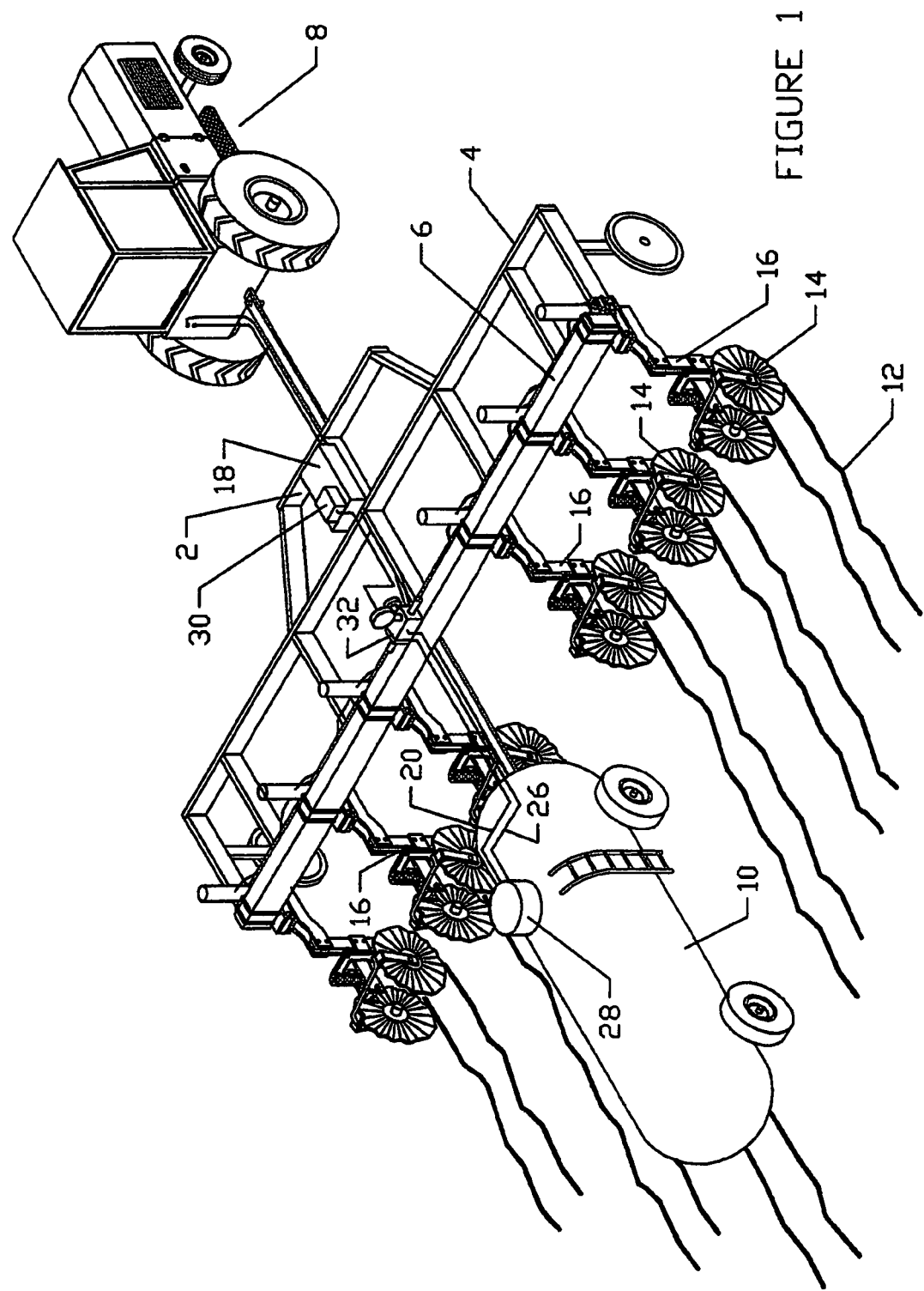
FIG. 1 is a perspective view of an exemplary $NH_3$ applicator and supply tank according to the invention, being drawn over a field by a tractor.

FIG. 1 discloses a tractor 8 drawing an applicator 4 over soil 12. Portable tank 10 is in turn drawn by applicator 4. Applicator 4 comprises a tool bar 6 on which are mounted soil interrupting knives 16 which are followed by paired coulters 14. Liquid anhydrous ammonia (NH$_3$) within tank 10 is distributed to knives 16 and the liquid NH$_3$ is injected into soil 12 behind each of knives 16 as knives 16 create shallow trenches by movement of knives 16 through soil 12. The trenches are closed by the pairs of coulters 14 associated with each of the knives 16.

Figure 2:
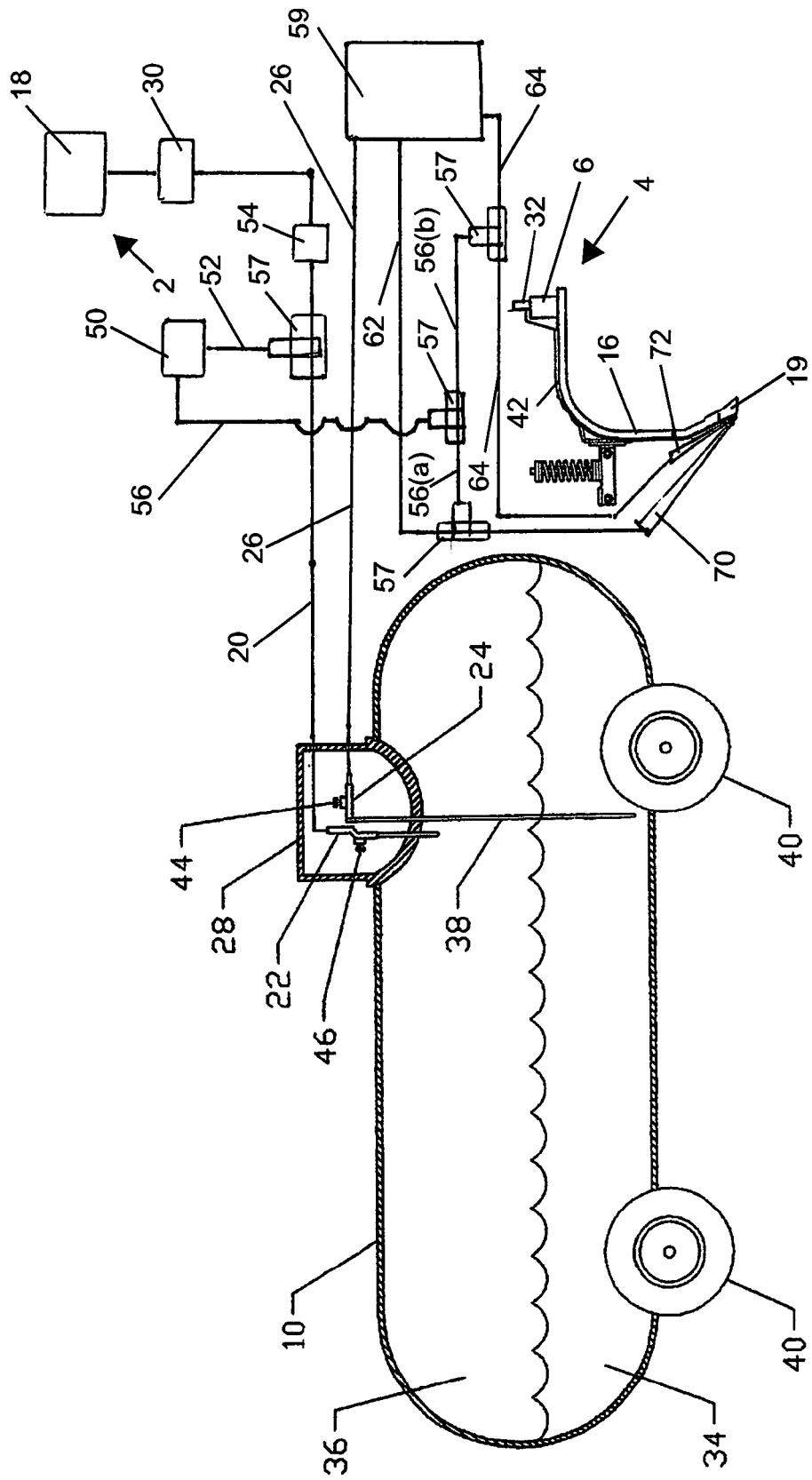
FIG. 2 is a schematic representation of the NH$_3$ application system of the present invention.

Referring now to both FIGS. 1 and 2, invention 2 comprises compressor 18 which is coupled by compressed gas duct 20 to vapor port 22 of tank 10. Compressor 18 compresses a gas, preferably air, though other gases may be used, and the compressed gas is delivered by compressed gas duct 20 to vapor port 22 where the compressed gas enters tank 10 and is joined with NH$_3$ vapor in the pressure head 36 above the liquid NH$_3$ 34 present in tank 10.

Head pressure within tank 10 forces liquid NH$_3$ to exit tank 10 through liquid port 24 and to pass through liquid pipe 26 to be distributed to knife ducts 42 leading down each of knives 16. A pressure regulator 30 may be connected to duct 20 such that pressure in duct 20 and therefore within the pressure head 36 of tank 10 may be monitored and maintained at a preselected pressure, preferably approximately 80-150 psi and more preferably approximately 100 psi. When the vapor pressure in the pressure head 36 within tank 10 drops below the preselected pressure, flow of liquid NH$_3$ from tank 10 will be slowed. When pressure below the preselected pressure is detected by regulator 30, the compressor 18 may be activated and compressed gas forced into tank 10 up to the preselected pressure. With the increased head pressure within tank 10, liquid NH$_3$ will flow more quickly to knives 16 such that the tractor 8 may draw the applicator 4 over the field at a desired speed and will not be required to slow to allow for adequate NH$_3$ to reach soil 12.

FIG. 2 schematically illustrates the structure of the invention. A liquid NH$_3$ storage tank 10 carried on wheels 40 contains a quantity of liquid NH$_3$ 34 therein. Above the surface of the liquid NH$_3$ 34, there is a pressure head 36 of gases, including NH$_3$ in vapor state. The tank 10 is provided with a liquid port 24 and a vapor port 22 which may be housed under a moveable valve cover 28. When the portable tank 10 is to be filled at a NH$_3$ supply facility, a liquid duct from a bulk supply reservoir (not illustrated) is coupled to the liquid port 24 and vapor pressure building in the tank 10 is vented through vapor port 22 to the bulk supply reservoir through suitable vapor duct means (also not illustrated in the drawings).

When the portable tank 10 is attached to fertilizer applicator 4 and both are driven over a field, liquid NH$_3$ is forced from the tank 10 by pressure of vapor in pressure head 36 so that liquid NH$_3$ will flow through liquid pipe 26 to an application control system 59. Liquid NH$_3$ flows out of control system 59 via a liquid output line 64 and vapor NH$_3$ flows out of control system 59 via a vapor output line 62. Eventually the liquid NH$_3$ is delivered to liquid port 72 and vaporous NH$_3$ is delivered to vapor port 70. As the environmental temperature drops, the vapor pressure of NH$_3$ in the pressure head 36 of tank 10 declines, reducing the speed of transfer of liquid NH$_3$ 34 to the applicator 4. Therefore, compressor 18 may be operated to compress air to be injected through vapor port 22 into pressure head 36 of tank 10 which will force liquid NH$_3$ 34 from tank 10 at a sufficient transfer rate for efficient application speed to be maintained.

Similarly, as the tank 10 empties of liquid NH$_3$, the pressure in pressure head 36 declines and compressor 18 may be operated to compress air to be injected through vapor port 22 into pressure head 36 of tank 10 which will force liquid NH$_3$ 34 from tank 10 fast enough for efficient application speed to be maintained.

A manually operated liquid valve 44 is available to stop flow of liquid NH$_3$ from tank 10 via liquid pipe 26. A manually operated vapor valve 46 is provided to stop flow of vapor from tank 10. These elements are standard on portable NH$_3$ tanks.

Compressed gas duct 20 couples vapor port 22 of tank 10 to compressor 18. Compressor 18 compresses a fluid, preferably air, and may be driven by a hydraulic motor which may be conveniently powered from the hydraulic fluid pumping system available on a standard farm tractor. Compressor 18 may alternately be powered by a separate gas engine or from other power sources and may be substituted with a pressurized storage tank of compressed gas. Some tractors or power units provide an onboard source of compressed air which may be used to pressurize pressure head 36.

The compressor 18 may be mounted to the tractor or to the applicator 4 or to the tank 10 at a convenient location which permits compressor 18 to be powered and to convey compressed air (or other gaseous fluid) to the vapor port 22 of tank 10 through compressed gas duct 20. A pressure regulator 30 may be optionally used to monitor and regulate the pressure of compressed air in the pressure head 36 of tank 10. The pressure regulator 30 may signal the compressor 18 to operate within a preselected range of pressures. A pressure of approximately 80-150 psi in pressure head 36 is found to be satisfactory to force liquid NH$_3$ 34 from tank 10 via dip tube 38 to NH$_3$ control system 59 which in turn supplies liquid NH$_3$ to each liquid port 72 and vaporous NH$_3$ to each vapor port 70 for incorporation in the soil as knife 16 of applicator 4 is drawn through the soil.

The apparatus further comprises a selectively operable actuator 50 which may be electrically operated and which is coupled to the gas duct 20 coupled to the vapor port 22 of the nurse tank 10. The actuator 50 is typically operated when the liquid anhydrous ammonia 34 in the tank is depleted or substantially depleted. However, the actuator 50 is selectively operable and can be activated at any time and is not prohibited from running in correspondence with any particular level of liquid anhydrous ammonia. First exhaust duct 52 passes compressed gasses from the pressure head 36 within the tank 10 to the actuator 50 which then sends compressed air through secondary ducts 56. A valve then can split the compressed air to secondary ducts 56a and 56b. Duct 56a pressurizes flow of the compressed air such that the compressed air is directed to the vapor port 70 which follow the knife shanks 17 and terminate near the toe 19 of each knife 16 which in operation is being drawn through the soil 12 below the ground surface. Therefore any anhydrous ammonia vapor mingled with the compressed air within the pressure head 36 is passed safely into the soil 12. In the same manner, duct 56b pressurizes flow of the compressed air such that the compressed air is directed to the liquid port 72. Although, both ducts 56a and 56b can be utilized, the preferred embodiment utilizes only the vapor port 70 to transport compressed air to the soil 12. In a different embodiment, only the liquid port 72 is used to transport the compressed air to the soil 12.

Single direction valve 54 is provided to prevent gases from the pressure head 36 from passing to the pressure regulator 30 and compressor 18 when actuator 50 is operated to couple vapor duct 20 to liquid duct 26. The connectors 57 can be T-style connections used to split certain ducts or lines. Each connector can further be associated with valves to prevent flow of gas or liquid in a particular direction.

It can therefore be understood that once tank 10 has been effectively emptied of liquid anhydrous ammonia, the actuator 50 can be activated to allow pressurized vapor from the pressure head 36 to pass safely into the soil by way of the vapor port 70 and/or liquid port 72. In a different embodiment the actuator 50 and associated ducts and valves can be added to an existing apparatus for applying liquid anhydrous ammonia.

The foregoing description of the invention has been presented for purposes of illustration and description and is not intended to be exhaustive or to limit the invention to the precise form disclosed. Modifications and variations of the embodiments are possible in light of the above disclosure or such may be acquired through practice of the invention. The embodiments illustrated were chosen in order to explain the principles of the invention and its practical application to enable one skilled in the art to utilize the invention in various embodiments and with various modifications as are suited to the particular use contemplated. It is intended that the scope of the invention be defined by the claims appended hereto, and by their equivalents.

Having described the invention, I claim:

1. An apparatus to apply liquid anhydrous ammonia to soil of a field, comprising:
   an anhydrous ammonia applicator moveable over the field;
   a portable tank containing liquid anhydrous ammonia coupled to the anhydrous ammonia applicator;
   a source of compressed air coupled to a port on the portable tank containing liquid anhydrous ammonia;
   a pressure regulator coupled to the source of compressed air;
   the pressure regulator supplying compressed air from the source of compressed air to the port on the portable tank when vapor pressure in a pressure head in the portable tank containing liquid anhydrous ammonia drops below a preselected pressure; the source of compressed air is an air compressor;
   the anhydrous ammonia applicator comprising knives,
   anhydrous ammonia ducts associated with each of the knives wherein anhydrous ammonia may be injected into soil of the field;
   an actuator coupled to the port on the portable tank;
   the actuator further coupled to at least one of the anhydrous ammonia ducts of the knives;
   the actuator selectively operable to couple the port of the portable tank to at least one of the anhydrous ammonia ducts of the knives wherein compressed vapor in the tank may be passed into the soil through the at least one of the anhydrous ammonia ducts of the knives;
   the pressure regulator monitoring pressure in the vapor head of the tank;
   the pressure regulator operative to cause the air compressor to supply compressed air to the tank to increase pressure in the vapor head.

2. The invention of claim 1, wherein:
   the pressure regulator activating the air compressor when vapor pressure in the tank falls below about 80 psi.

3. The invention of claim 2, wherein:
   the pressure regulator deactivates the air compressor when the vapor pressure in the tank exceeds about 150 psi.

4. An apparatus to apply liquid anhydrous ammonia to soil of a field, comprising:
   an anhydrous ammonia applicator moveable over the field;
   a portable tank containing liquid anhydrous ammonia coupled to the anhydrous ammonia applicator;
   a source of compressed air coupled to a port on the portable tank containing liquid anhydrous ammonia;
   a control apparatus coupled to the source of compressed air;
   the control apparatus supplying compressed air from the source of compressed air to the port on the portable tank when vapor pressure in a pressure head in the portable tank containing liquid anhydrous ammonia drops below a preselected pressure;
   the anhydrous ammonia applicator comprising knives,
   liquid anhydrous ammonia ducts associated with each of the knives wherein liquid anhydrous ammonia may be injected into soil of the field;
   an actuator coupled to the port on the portable tank;
   the actuator further coupled to at least one of the liquid anhydrous ammonia ducts of the knives;
   the actuator selectively operable to couple the port of the portable tank to at least one of the liquid anhydrous ammonia ducts of the knives wherein compressed vapor in the tank may be passed into the soil through the at least one of the liquid anhydrous ammonia ducts of the knives;
   a valve system preventing the gases from moving in a first direction;
   the valve system comprises a first single direction valve;
   the first single direction valve prevents gases from the pressure head from passing to the control apparatus.

5. The apparatus of claim 4, wherein:
   the second single direction valve prevents return of vapor from the pressure head from returning to the tank.

6. The apparatus of claim 5, wherein;
   the actuator activates when the tank is substantially void of liquid anhydrous ammonia.

7. The apparatus of claim 6, wherein:
   the actuator is coupled to the at least one of the liquid anhydrous ducts via a second compressed air duct.

8. The apparatus of claim 7, wherein:
   the actuator is electrically operated.

9. An apparatus attachable to a liquid anhydrous applicator having a portable tank, comprising:
   an actuator;
   the actuator selectively operable to couple a port of the portable tank to at least one anhydrous ammonia duct of the applicator wherein compressed vapor in the tank may be passed into the soil through the at least one of the anhydrous ammonia ducts;
   a valve system preventing gases from moving in a first direction;
   the valve system comprises a first single direction valve;
   the actuator connected to a vapor port of the at least one anhydrous ammonia duct;
   the actuator activates when the tank is substantially void of liquid anhydrous ammonia.

10. The apparatus of claim 9, wherein:
    a second single direction valve prevents return of vapor from a pressure head of the tank from returning to the tank.

11. The apparatus of claim 10, wherein:
the actuator is electrically operated.

12. An apparatus to apply liquid anhydrous ammonia to soil of a field, comprising:
- an anhydrous ammonia applicator moveable over the field;
- a portable tank containing liquid anhydrous ammonia coupled to the anhydrous ammonia applicator;
- a source of compressed air coupled to a port on the portable tank containing liquid anhydrous ammonia;
- a pressure regulator coupled to the source of compressed air;
- the pressure regulator supplying compressed air from the source of compressed air to the port on the portable tank when vapor pressure in a pressure head in the portable tank containing liquid anhydrous ammonia drops below a preselected pressure;
- the anhydrous ammonia applicator comprising knives,
- anhydrous ammonia ducts associated with each of the knives wherein anhydrous ammonia may be injected into soil of the field;
- an actuator coupled to the port on the portable tank;
- the actuator further coupled to at least one of the anhydrous ammonia ducts of the knives;
- the actuator selectively operable to couple the port of the portable tank to at least one of the anhydrous ammonia ducts of the knives wherein compressed vapor in the tank may be passed into the soil through the at least one of the anhydrous ammonia ducts of the knives;
- the tank is supported on wheels and is drawn by the anhydrous ammonia applicator;
- the source of compressed air is an air compressor;
- the air compressor is coupled to a vapor port on the tank;
- the applicator is drawn over the field by a power unit;
- the anhydrous ammonia applicator comprises at least one injection knife;
- a liquid duct associated with the at least one injection knife;
- the liquid duct coupled to a liquid port on the tank;
- the liquid duct discharges liquid anhydrous ammonia near a lower end of the at least one injection knife;
- the pressure regulator is coupled to the air compressor;
- the pressure regulator activating the air compressor when the vapor pressure in the tank falls below about 80 psi.

* * * * *